(12) United States Patent
Jang

(10) Patent No.: US 11,507,272 B2
(45) Date of Patent: Nov. 22, 2022

(54) CONTROLLER FOR PERFORMING GARBAGE COLLECTION OPERATION BASED ON PERFORMANCE RATIO AND MEMORY SYSTEM INCLUDING THE SAME

(71) Applicant: SK hynix Inc., Gyeonggi-do (KR)

(72) Inventor: Minjun Jang, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 95 days.

(21) Appl. No.: 16/921,402

(22) Filed: Jul. 6, 2020

(65) Prior Publication Data

US 2021/0132815 A1 May 6, 2021

(30) Foreign Application Priority Data

Oct. 31, 2019 (KR) .................. 10-2019-0137695

(51) Int. Cl.
*G06F 3/06* (2006.01)
*G06F 12/02* (2006.01)

(52) U.S. Cl.
CPC .......... *G06F 3/0608* (2013.01); *G06F 3/0652* (2013.01); *G06F 3/0653* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 7,996,446 B2 * | 8/2011 | Bacon | ................. | G06F 12/0253 707/816 |
| 10,114,552 B2 * | 10/2018 | Kim | ..................... | G06F 3/0679 |
| 10,303,600 B2 * | 5/2019 | Lin | ..................... | G06F 12/0238 |
| 10,430,083 B2 * | 10/2019 | Kim | ..................... | G06F 12/0246 |
| 10,437,721 B2 * | 10/2019 | Leshinsky | ........... | G06F 12/0253 |
| 2007/0033325 A1 * | 2/2007 | Sinclair | ................. | G06F 3/0679 711/103 |
| 2008/0082596 A1 * | 4/2008 | Gorobets | ............ | G06F 12/0253 |
| 2016/0132429 A1 * | 5/2016 | Lin | ..................... | G06F 12/0238 707/814 |
| 2017/0102884 A1 * | 4/2017 | Kim | ..................... | G06F 3/0613 |
| 2018/0074723 A1 * | 3/2018 | Delaney | ................ | G06F 3/0608 |
| 2019/0042102 A1 * | 2/2019 | Kim | ..................... | G06F 3/0679 |
| 2019/0163622 A1 * | 5/2019 | Wu | ..................... | G06F 12/0253 |

FOREIGN PATENT DOCUMENTS

KR 10-2017-0014874 2/2017

* cited by examiner

*Primary Examiner* — Christopher D Birkhimer
(74) *Attorney, Agent, or Firm* — IP &T Group LLP

(57) ABSTRACT

A memory system which is capable of dynamically adjusting the frequency of performing a garbage collection operation based on a performance ratio. The memory system includes: a memory device including a plurality of storage spaces; and a controller controlling the memory device, wherein the controller determines a performance ratio, which is ratio of performance of a garbage collection operation to a total performance of the memory system, for securing free storage space in the memory device based on a performance requirement of the memory system and the free storage space, schedules the garbage collection operation based on the performance ratio, and performs the garbage collection operation according to the schedule, wherein the total performance indicates a sum of a performance of all operations performed in the memory system.

17 Claims, 8 Drawing Sheets

CONTROLLER FOR PERFORMING GARBAGE COLLECTION OPERATION BASED ON PERFORMANCE RATIO AND MEMORY SYSTEM INCLUDING THE SAME

CROSS-REFERENCE TO RELATED APPLICATION

The present application claims priority of Korean Patent Application No. 10-2019-0137695, filed on Oct. 31, 2019, which is incorporated herein by reference in its entirety.

BACKGROUND

1. Field

Various embodiments of the present invention relate to a controller for controlling a memory device, and a memory system including the memory device and the controller.

2. Description of the Related Art

The computer environment paradigm has been transitioning to ubiquitous computing, which enables computing systems to be used anytime and anywhere. As a result, use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

Since they have no moving parts, memory systems provide advantages such as excellent stability and durability, high information access speed, and low power consumption. Examples of memory systems having such advantages include universal serial bus (USB) memory devices, memory cards having various interfaces, and solid state drives (SSD).

SUMMARY

Embodiments of the present invention are directed to a controller that may improve the performance of a memory system by dynamically adjusting the frequency of performing a garbage collection operation, and the memory system including the controller.

In accordance with an embodiment of the present invention, a memory system includes: a memory device including a plurality of storage spaces; and a controller suitable for controlling the memory device, wherein the controller determines a performance ratio, which is ratio of performance of a garbage collection operation to a total performance of the memory system, for securing free storage space in the memory device based on a performance requirement of the memory system and the free storage space, schedules the garbage collection operation based on the performance ratio, and performs the garbage collection operation according to the schedule.

In accordance with another embodiment of the present invention, a controller for controlling a memory device including a plurality of storage spaces includes: a garbage collection scheduler suitable for determining a performance ratio, which is a ratio of performance of a garbage collection operation to a total performance of the memory system, for securing free storage space in the memory device based on performance requirement of the memory system and the free storage space, and scheduling the garbage collection operation based on the performance ratio of the garbage collection operation; and a garbage collection executor suitable for performing the garbage collection operation according to the schedule.

In accordance with still another embodiment of the present invention, an operating method of a controller, the operating method includes controlling a nonvolatile memory device to perform a garbage collection operation according to an operation interval determined by Equation 2:

$$(\text{User write}) = \begin{cases} \{(A-1) - A \times Rgc(n)\} \times (GC \text{ write}) & (n < T) \\ \dfrac{1 - Rgc(n)}{Rgc(n)} \times (GC \text{ write}) & (n \geq T) \end{cases}, \quad [\text{Equation 2}]$$

wherein (User write) represents the operation interval represented by a user data amount; n represents a number of free storage spaces within the nonvolatile memory device; T represents a threshold number of free storage spaces; A represents a constant; Rgc(n) represents a performance ratio of the garbage collection operation determined by Equation 1; and (GC write) represents an amount of garbage collection data written by the garbage collection operation for a set operation time duration, $$Rgc(n) = \begin{cases} G(n)(T-n) + Rgci & (n < T) \\ Rgci & (n \geq T) \end{cases}, \quad [\text{Equation 1}]$$

wherein Rgc(n) represents the performance ratio of the garbage collection operation; Rgci represents a constant that is set to satisfy a desired sustained performance when n≥T; and G(n) is a function that increases the performance ratio of the garbage collection operation when n<T.

DETAILED DESCRIPTION

Figure 1:
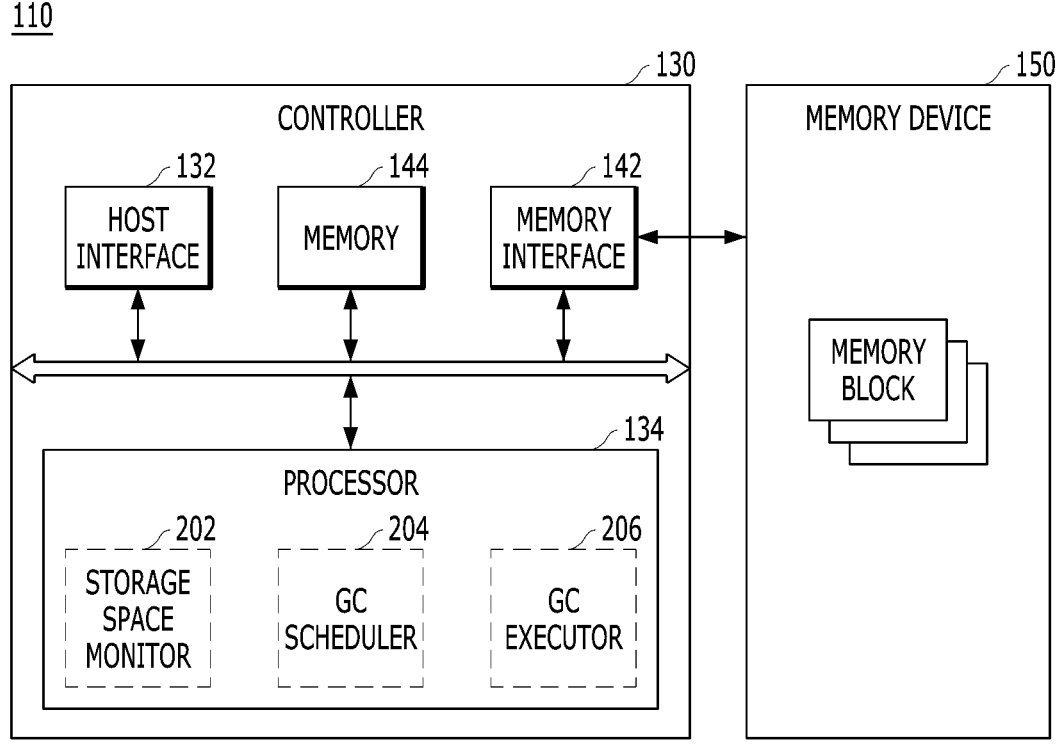
FIG. 1 is a block diagram schematically illustrating a memory system in accordance with an embodiment of the present invention.

Various embodiments of the present invention are described below in more detail with reference to the accompanying drawings. The present invention may, however, be embodied in different forms and should not be construed as limited to the embodiments set forth herein. Rather, these embodiments are provided so that this disclosure is thorough and complete, and fully conveys the scope of the present invention to those skilled in the art. Throughout the disclosure, like reference numerals refer to like parts throughout the various figures and embodiments of the present invention. It is also noted that reference to "an embodiment," "another embodiment" or the like does not necessarily mean only one embodiment, and different references to any such phrase are not necessarily to the same embodiment(s).

Hereinafter, embodiments of the present invention are described in more detail with reference to the accompanying drawings.

FIG. 1 is a block diagram schematically illustrating a memory system 110 in accordance with an embodiment of the present invention.

The memory system 110 may operate to store data for the host 102 in response to a request of the host 102. Non-limiting examples of the memory system 110 include a solid state drive (SSD), a multi-media card (MMC), a secure digital (SD) card, a universal storage bus (USB) device, a universal flash storage (UFS) device, compact flash (CF) card, a smart media card (SMC), a personal computer memory card international association (PCMCIA) card and memory stick. Examples of an MMC include an embedded MMC (eMMC), reduced size MMC (RS-MMC) and micro-MMC. Examples of an SD card include a mini-SD card and micro-SD card.

The memory system 110 may be embodied by any of various types of storage devices. Examples of such storage devices may include, but are not limited to, volatile memory devices such as a dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM or ReRAM) and a flash memory. The flash memory may have a 3-dimensional (3D) stack structure.

The memory system 110 may include a controller 130 and a memory device 150. The memory device 150 may store data for the host 102, and the controller 130 may control data storage into the memory device 150.

The controller 130 and the memory device 150 may be integrated into a single semiconductor device. For example, the controller 130 and the memory device 150 may be integrated as one semiconductor device to constitute a solid state drive (SSD). When the memory system 110 is used as an SSD, the operating speed of the host 102 connected to the memory system 110 can be improved. In addition, the controller 130 and the memory device 150 may be integrated as one semiconductor device to constitute a memory card such as a personal computer memory card international association (PCMCIA) card, compact flash (CF) card, smart media (SM) card, memory stick, multimedia card (MMC) including reduced size MMC (RS-MMC) and micro-MMC, secure digital (SD) card including mini-SD card, micro-SD card and SDHC card, or universal flash storage (UFS) device.

Non-limiting application examples of the memory system 110 include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, any of various electronic devices constituting a home network, any of various electronic devices constituting a computer network, any of various electronic devices constituting a telematics network, a Radio Frequency Identification (RFID) device, or one of various components constituting a computing system.

The memory device 150 may be a nonvolatile memory device and may retain data stored therein even though power is not supplied. The memory device 150 may store data provided from the host 102 through a program operation, and provide data stored therein to the host 102 through a read operation. The memory device 150 may include a plurality of memory blocks each of which may include a plurality of pages, and each of the pages may include a plurality of memory cells coupled to a word line. In an embodiment, the memory device 150 may be a flash memory. The flash memory may have a 3-dimensional (3D) stack structure. The hierarchical structure of the memory device 150 is described in detail with reference to FIG. 2.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, program and erase operations of the memory device 150.

The controller 130 may include a host interface (I/F) 132, a processor 134, a memory I/F 142, and a memory 144, all operatively coupled via an internal bus.

The host I/F 132 may be configured to process a command and data of the host 102, and may communicate with the host 102 through one or more of various interface protocols such as universal serial bus (USB), multi-media card (MMC), peripheral component interconnect-express (PCI-e or PCIe), small computer system interface (SCSI), serial-attached SCSI (SAS), serial advanced technology attachment (SATA), parallel advanced technology attachment (PATA), enhanced small disk interface (ESDI) and integrated drive electronics (IDE).

The host I/F 132 may be driven through firmware referred to as a host interface layer (HIL) in order to exchange data with the host.

The memory I/F 142 may serve as a memory/storage interface for interfacing the controller 130 and the memory device 150 such that the controller 130 controls the memory device 150 in response to a request from the host 102. When the memory device 150 is a flash memory or specifically a NAND flash memory, the memory I/F 142 may generate a control signal for the memory device 150 and process data to be provided to the memory device 150 under the control of the processor 134. The memory I/F 142 may work as an interface (e.g., a NAND flash interface) for processing a command and data between the controller 130 and the memory device 150. Specifically, the memory I/F 142 may support data transfer between the controller 130 and the memory device 150.

The memory I/F 142 may be driven through firmware referred to as a flash interface layer (FIL) in order to exchange data with the memory device 150.

The memory 144 may serve as a working memory of the memory system 110 and the controller 130, and store data for driving the memory system 110 and the controller 130. The controller 130 may control the memory device 150 to perform read, program and erase operations in response to a request from the host 102. The controller 130 may provide data read from the memory device 150 to the host 102, may store data provided from the host 102 into the memory device 150. The memory 144 may store data required for the controller 130 and the memory device 150 to perform these operations.

The memory 144 may be embodied by a volatile memory. For example, the memory 144 may be embodied by static random access memory (SRAM) or dynamic random access memory (DRAM). The memory 144 may be disposed within or out of the controller 130. FIG. 1 exemplifies the memory 144 disposed within the controller 130. In an embodiment, the memory 144 may be embodied by an external volatile memory having a memory interface transferring data between the memory 144 and the controller 130.

As described above, the memory 144 may store data required for performing a data write/read operation between the host and the memory device 150 and data when the data write/read operation is performed. In order to store such data, the memory 144 may include a program memory, data memory, write buffer/cache, read buffer/cache, data buffer/cache, map buffer/cache or the like.

The processor 134 may control the overall operations of the memory system 110. The processor 134 may drive firmware to control the overall operations of the memory system 110. The firmware may be referred to as flash translation layer (FTL). Also, the processor 134 may be realized as a microprocessor or a central processing unit (CPU).

The processor 134 may drive a flash translation layer and perform a foreground operation corresponding to a request received from the host. For example, the processor 134 may control a write operation of the memory device 150 in response to a write request from the host and control a read operation of the memory device 150 in response to a read request from the host.

The memory device 150 may not support an overwrite operation. In order to rewrite data into a memory cell in which data are written, an erase operation may have to precede the rewrite operation. The unit of a write operation and the unit of an erase operation of the memory device 150 may be different. For example, the memory device 150 may perform a write operation on the basis of a page and perform an erase operation on the basis of a memory block. Thus, the controller 130 may update data stored in a particular page by controlling the memory device 150 to write the data to be updated into another page and invalidating the particular page. As the number of invalidated pages increases in the memory device 150 as a result of the data update operation of the controller 130, the storage space for storing data may become insufficient.

In order to remove invalid pages of a memory block, the controller 130 may perform a series of operations of copying valid pages of victim blocks into a target block and erasing the data of the victim blocks. This series of operations may be called a garbage collection (GC) operation. The garbage collection operation is described in detail below with reference to FIG. 3.

The processor 134 may perform a garbage collection operation as a background operation. The garbage collection operation is to secure the storage space of the memory device 150, but the garbage collection operation may restrict the foreground operation of the memory system 110 while the garbage collection operation is performed. This is because the memory device 150 may not be able to perform a read operation and a write operation corresponding to a request of the host while performing the read, write and erase operations that are accompanied by a garbage collection operation. The controller 130 may schedule the garbage collection operation in such a manner that the response to the request of the host is not significantly delayed due to the garbage collection operation. For example, the processor 134 may be able to schedule a garbage collection operation by adjusting the interval between garbage collection operations or the frequency at which garbage collection is performed. The scheduling of garbage collection operations is described in detail with reference to FIG. 4.

The processor 134 may schedule a garbage collection operation based on the size of the free storage space of the memory device 150. When the memory device 150 has a sufficient storage space, the processor 134 may determine the garbage collection operation interval to be relatively long, i.e., to perform garbage collections relatively infrequently. By setting the garbage collection to be performed relatively infrequently, the memory system 110 may provide a user with a high foreground operation performance. On the other hand, when the free storage space of the memory device 150 is insufficient, the processor 134 may determine the garbage collection operation interval to be relatively short, i.e., to more frequently perform garbage collections. By performing garbage collection more frequently, the memory system 110 may quickly secure the storage space.

According to the prior art, the processor 134 may determine a garbage collection level according to the size of the free storage space and may schedule the garbage collection operation by adjusting the garbage collection operation time duration and the garbage collection operation interval based on the determined garbage collection level.

For example, the processor 134 may determine the garbage collection level to be 0 when the ratio of a dirty storage space, which is a storage space in which data are stored, to the total storage space of the memory device 150 is less than approximately 10%, and when the ratio of the dirty storage space is approximately 10% or more and less than approximately 60%, the processor 134 may determine the garbage collection level to be 1. When the ratio of the dirty storage space is equal to or greater than approximately 60% and the number of free blocks is equal to or greater than a first number, the processor 134 may determine the garbage collection level to be 2, and when the ratio of dirty storage space is equal to or greater than approximately 60% and the number of free blocks is less than the first number, the processor 134 may determine the garbage collection level to be 3. The higher the garbage collection level, the longer the garbage collection operation time duration compared to the garbage collection operation interval. Herein, a free block may refer to a memory block of which all the pages are erased.

The processor 134 may shorten the garbage collection operation interval as the garbage collection level increases. A method of varying the garbage collection operation scheduling according to the garbage collection level may be referred to herein as level-based garbage collection.

A user may expect a certain minimum level of foreground performance even when the memory system 110 performs a garbage collection operation. However, according to the level-based garbage collection operation scheme, it may be difficult to design the processor 134 to satisfy the foreground performance requirement.

For example, a plurality of parameters may be determined that include the number of garbage collection levels, the size of free storage space for each garbage collection level, and the garbage collection operation interval for each garbage collection level in order for the processor 134 to perform a level-based garbage collection operation.

Also, it is difficult to estimate whether the memory system 110 satisfies the performance requirement or not based on the value of each of the parameters. Accordingly, it is required to set the parameters in the processor 134 and then perform read/write tests on the memory system 110 to determine whether or not the memory system 110 satisfies the performance requirement with the set parameters. When it is determined that the memory system 110 does not satisfy the performance requirement with the set parameters, another test should be performed on the memory system 110 with different values of the parameters. According to the prior art, it is difficult to optimize the performance of the memory system 110 without performing many tests on the memory system 110 with variously set parameters.

According to an embodiment of the present invention, the processor 134 may schedule a garbage collection operation based on a criterion (or criteria) in consideration of the performance requirement(s) of the memory system 110. For example, a specification of the memory system 110 may provide performance requirements such as read throughput and write throughput in a sustain state and a dirty state of the memory system 110. The criterion may be set based on how much, e.g., a percentage, of the total performance of the memory system 110 is to be used for a garbage collection operation in order to satisfy the performance requirement(s) of the memory system 110.

According to an embodiment of the present disclosure, the processor 134 may determine the ratio of the performance of a garbage collection operation to the total performance of the memory system 110 (garbage collection performance ratio or simply performance ratio) based on the size of the free storage space, and schedule a garbage collection operation based on the performance ratio. The total performance may indicate a sum of a performance of all operation performed in the memory system 110. For example, the total performance may be determined to a sum of the performance of the garbage collection operation and a performance of the foreground operation.

For example, the processor 134 may determine the performance ratio based on a criterion and the size of the free storage space to maximize the efficiency of the garbage collection operation while still satisfying the performance requirement(s) of the memory system 110. Also, the processor 134 may schedule a garbage collection operation based on a criterion and the performance ratio in consideration of performance requirement(s) and the necessity for securing storage space.

The method for scheduling a garbage collection operation based on the performance ratio may be referred to herein as performance-based garbage collection. The performance-based garbage collection according to an embodiment of the present invention is described with reference to FIGS. 5 to 7.

According to an embodiment of the present invention, since the garbage collection operation is scheduled based on a criterion which is determined according to the performance requirement(s), it may be easily estimated whether or not the memory system 110 satisfies the performance requirement(s). Instead of determining the number of garbage collection levels and a plurality of parameters for each garbage collection level, the processor 134 may be configured to satisfy the performance requirement(s) of the memory system 110 by determining a few parameters. Thus, the processor 134 can be designed or configured to satisfy the performance requirement(s) of the memory system 110 without having to perform a large number of tests on the memory system 110. The effect of the performance-based garbage collection is described in detail with reference to FIG. 8.

According to an embodiment of the present disclosure, the processor 134 may include a storage space monitor 202, a garbage collection scheduler 204, and a garbage collection executor 206 to schedule a garbage collection operation and perform a garbage collection operation.

The storage space monitor 202 may manage information about the storage space in the memory device 150. The storage space monitor 202 may provide the garbage collection scheduler 204 with free storage space information, for example, the number of free blocks or information indicative thereof. For example, the storage space monitor 202 may determine whether each memory block is a free block or a dirty block based on the states of the pages that form that memory block. For example, the state of each page may be an erase state, a valid state and an invalid state. A memory block of which all the pages are erased state may be determined as the free block. A memory block that is not a free block may be determined as the dirty block.

The garbage collection scheduler 204 may determine a performance ratio based on the number of free blocks among the memory blocks, may determine a garbage collection operation interval based on the performance ratio and may instruct, through a garbage collection operation instruction signal, performance of a garbage collection operation in a timely manner based on the garbage collection operation interval.

The garbage collection executor 206 may perform a garbage collection operation in response to the garbage collection operation instruction signal.

According to an embodiment of the present invention, the storage space monitor 202, the garbage collection scheduler 204, and the garbage collection executor 206 may be realized as software and executed by the processor 134.

Figure 2:
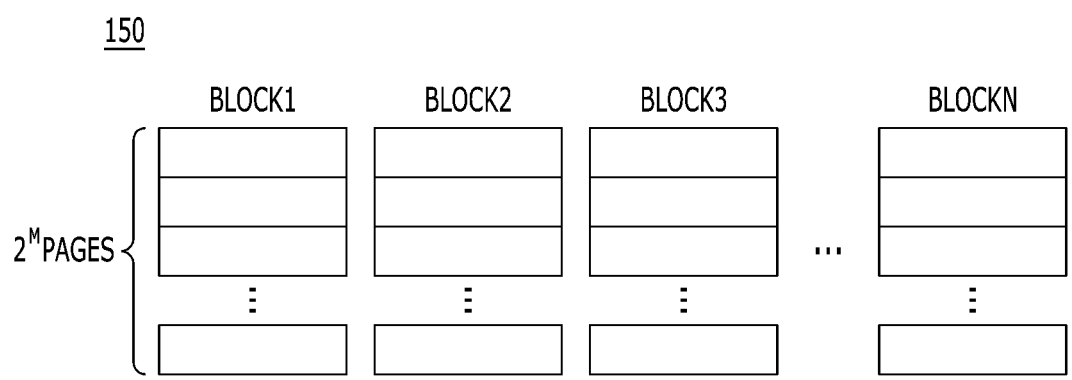
FIG. 2 illustrates a memory device.

FIG. 2 illustrates a memory device 150.

Referring to FIG. 2, the memory device 150 may include a plurality of memory blocks, e.g., BLOCK1, BLOCK2, BLOCK3, . . . to BLOCKN. Each of the memory blocks may include a plurality of pages, for example $2^M$ pages, the number of which may vary according to circuit design. For example, in some applications, each of the memory blocks may include M pages. Each of the pages may include a plurality of memory cells that are coupled to a word line WL.

In accordance with an embodiment of the present invention, the memory device 150 is described as a non-volatile memory, such as a flash memory, e.g., a NAND flash memory. However, the memory device 150 may be realized as any of a Phase Change Random Access Memory (PCRAM), a Resistive Random Access Memory (RRAM or ReRAM), a Ferroelectric Random Access Memory (FRAM), a Spin Transfer Torque Magnetic Random Access Memory (SU-RAM or STT-MRAM).

Each of the memory blocks may store the data transferred from the host 102 and transfer data stored therein to the host 102 in response to a control of the processor 134. A garbage collection executor 206 may perform the garbage collection operation to remove invalid pages of the memory blocks.

Figure 3:
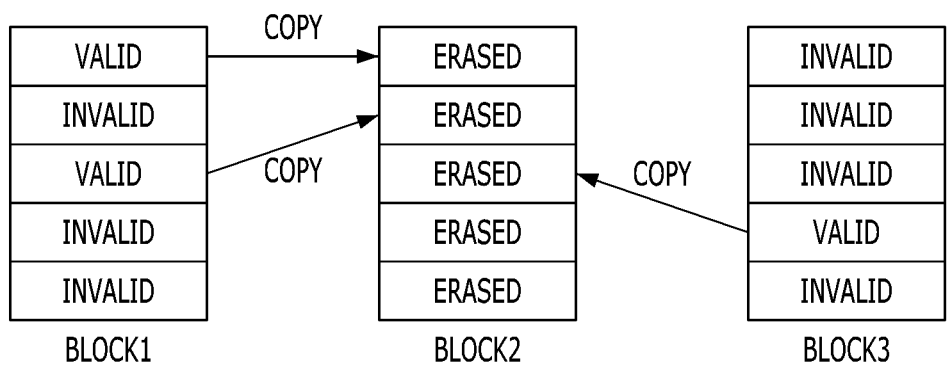
FIG. 3 illustrates a garbage collection operation.

FIG. 3 illustrates a garbage collection operation.

FIG. 3 illustrates first to third memory blocks BLOCK1 to BLOCK3 each of which includes five pages. Each page may be in one of multiple states, i.e., a valid state (VALID) in which case the page contains valid data that has been written thereto, an invalid state (INVALID) in which case the page contains invalid data, or an erase state (ERASED).

In the example of FIG. 3, a second block BLOCK2 is a free block, and a first block BLOCK1 and a third block BLOCK3 are dirty blocks.

The garbage collection executor 206 may copy the valid data of the first block BLOCK1 and the third block BLOCK3 into the second block BLOCK2. After copying the valid data into the second block BLOCK2, the garbage collection executor 206 may control the memory device 150 to perform an erase operation on the first block BLOCK1 and the third block BLOCK3. The invalid data of the first block BLOCK1 and the third block BLOCK3 may be removed, and data may be stored in the first block BLOCK1 and the third block BLOCK3. A block in which an erase operation is to be performed, such as the first block BLOCK1 and the third block BLOCK3, may be referred to as a victim block, and a block into which valid data are copied, such as the second block BLOCK2, may be referred to as a target block.

The garbage collection scheduler 204 may schedule a garbage collection operation in such a manner that a foreground operation is not significantly delayed due to a garbage collection operation.

Figure 4:
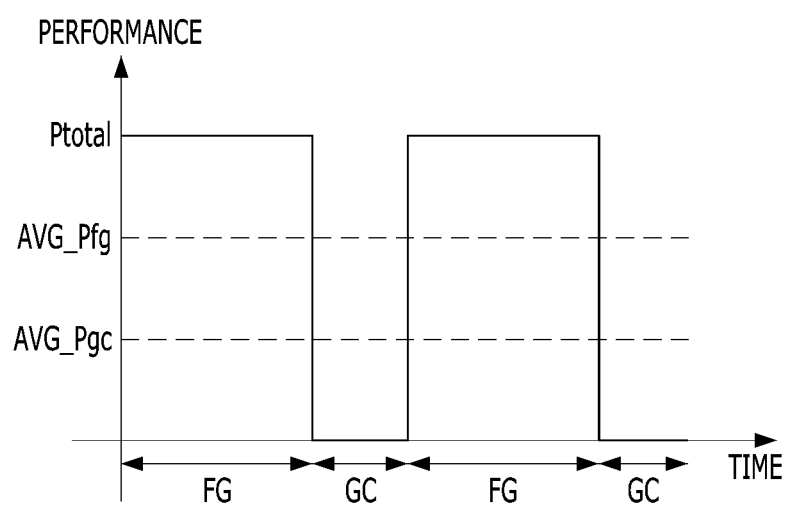
FIG. 4 is a graph describing the performance of a memory system according to garbage collection scheduling.

FIG. 4 is a graph describing the performance of the memory system 110 according to garbage collection scheduling.

FIG. 4 is a graph schematically illustrating an operation performance of the memory system 110 based on time. The time at which a foreground operation FG is performed and the time at which a garbage collection operation GC is performed are shown on the TIME axis of the graph. The total performance Ptotal of the memory system 110, a foreground operation average performance AVR_Pfg, and a garbage collection operation average performance AVR_Pgc are shown on the PERFORMANCE axis of the graph.

Referring to FIG. 4, the garbage collection scheduler 204 may schedule the garbage collection executer 206 to alternately perform a foreground operation FG and a garbage collection operation GC. An amount of time during which a garbage collection operation is performed may be referred to as a garbage collection operation time duration, and an amount of time during which a foreground operation is performed between adjacent garbage collection operations may be referred to as a garbage collection operation interval.

For example, the operation time duration may be predetermined. Based on the predetermined operation time duration, a first amount which is the amount of garbage collection data written into the memory device 150 through a single garbage collection operation may be determined. In order to perform garbage collection operation on the first amount of data, the garbage collection executor 206 may read the first amount of data from source memory blocks of the memory device 150 and write the collected data to destination memory blocks of the memory device 150. Since a time to read the first amount of data is shorter than a time to write the first amount of data, the time to read the first of data can be ignored. Therefore, the first amount is determined as an amount of data the memory system 110 can write during the predetermined operation time duration with the total performance of the memory system 110.

The garbage collection scheduler 204 may determine the operation interval based on a second amount, which is the amount of user data written into the memory device 150 through a foreground operation.

When the garbage collection scheduler 204 performs a garbage collection operation once, the garbage collection scheduler 204 may write data of the first amount and may perform a garbage collection operation again after writing data of the second amount as a foreground operation. As the garbage collection scheduler 204 determines the operation interval, the memory system 110 may alternately perform a foreground operation and a garbage collection operation. The memory system 110 may be able to provide a response that is not significantly delayed according to a request of the host 102 while securing a storage space by performing a garbage collection operation.

The solid line in the graph of FIG. 4 shows the performance of a foreground operation. While the memory system 110 performs the foreground operation, the performance of the foreground operation may reach the total performance, and while the memory system 110 performs the background operation, the performance of the foreground operation may decrease to the lowest performance. The garbage collection scheduler 204 may adjust the average performance of the memory system 110 by adjusting the second amount based on the first amount. The dotted lines in the graph represent the average performance AVG_Pfg of the foreground operation and the average performance AVG_Pgc of a garbage collection operation. The garbage collection operation performance and the foreground operation performance described below all represent average performances. The sum of the garbage collection operation performance and the foreground operation performance represent the total performance of the memory system 110.

Hereinafter, a method for performing a performance-based garbage collection operation by the processor 134 is described in detail in accordance with an embodiment of the present invention.

Figure 5:
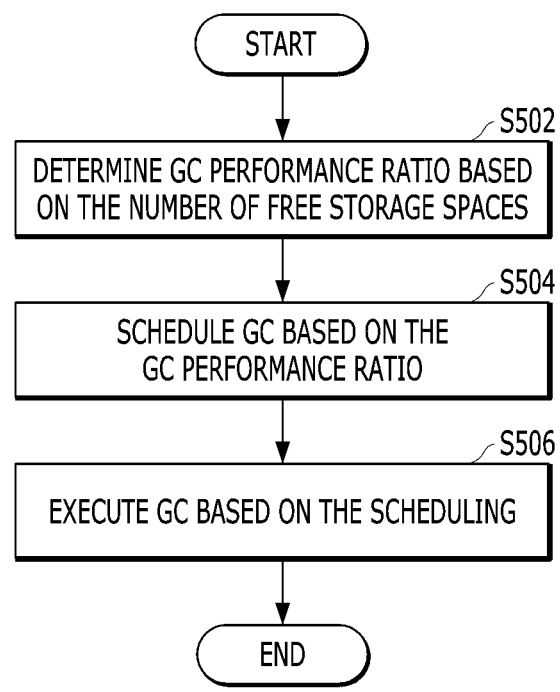
FIG. 5 is a flowchart describing an operation of a memory system in accordance with an embodiment of the present invention.

FIG. 5 is a flowchart describing an operation of the memory system 110 in accordance with an embodiment of the present invention.

In step S502, the garbage collection scheduler 204 may determine the GC performance ratio, i.e., the ratio of the performance of a garbage collection operation to the total performance of the memory system 110 based on the number of free storage spaces. For example, the garbage collection scheduler 204 may obtain information on the number of free blocks, i.e., free block number information from the storage space monitor 202. The GC performance ratio may be a function of the number of free blocks. An example of the GC performance ratio is described with reference to FIGS. 6A and 6B.

Figure 6A:
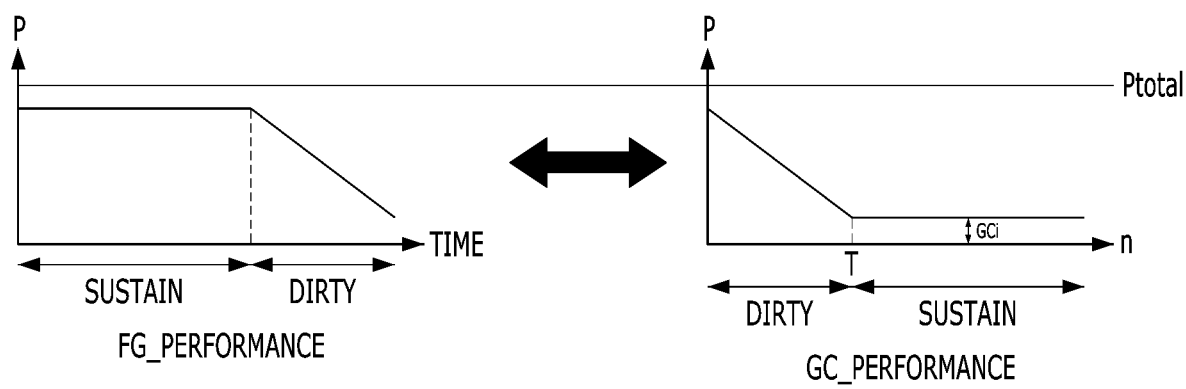
FIGS. 6A and 6B are graphs describing a performance ratio of the garbage collection operation.
Figure 6B:
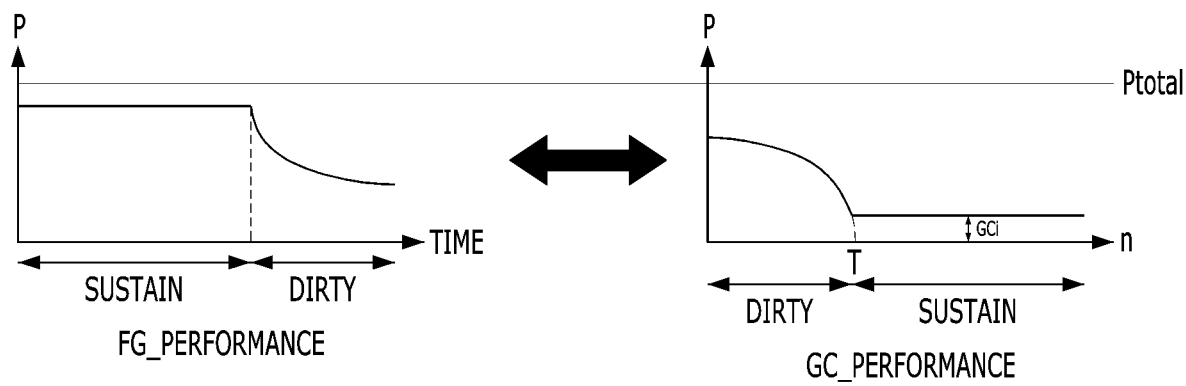

FIGS. 6A and 6B are graphs describing GC performance ratio.

The graph on the left side of FIG. 6A qualitatively illustrates the performance of the foreground operation based on time when data are continuously written into the memory system 110. The graph on the right shows garbage collection operation performance according to the number (n) of free blocks. Ptotal shown in both graphs represents the total performance that the memory system 110 may achieve.

When the memory device 150 has sufficient free storage space, the memory system 110 may require the foreground operation performance to be maintained at a minimum level that represents a performance requirement. Since the total performance of the memory system 110 is limited, the GC performance ratio may be lowered when the foreground operation performance is maintained.

When the free storage space of the memory device 150 is insufficient, it is necessary to quickly and perhaps frequently generate free blocks in order to secure free storage space. The GC performance ratio may be increased in order for the memory system 110 to quickly generate free blocks.

The left graph shows a situation in which when the free storage space becomes insufficient due to continuous data writing while the foreground operation performance is maintained during the initial stage of the memory system 110, the free storage space may be secured instead of maintaining the foreground operation performance. A state where the memory device 150 has enough free storage space to sustain or maintain the foreground operation performance at a certain level is referred to as a sustained state, and a state where the free storage space is insufficient such that it causes the foreground operation performance to decrease is referred to as a dirty state. The sustained performance is the foreground operation performance that is supposed be sustained. For example, the specification of the memory system 110 may require that the performance is sustained beyond a first performance when the free space of the memory system 110 is greater than or equal to a threshold. On the other hand, the specification may not require that the performance is sustained the first performance when the free space of the memory system 110 is less than the threshold. The state that the free space is greater than or equal to the threshold may be the sustain state. The state that the free space is less than the threshold may be the dirty state. The first performance may be the sustain performance.

'T' shown in the right graph may represent the threshold number of free blocks, which serves as a criterion for distinguishing the sustained state from the dirty state. The threshold number of free blocks may be predetermined.

When the number of free blocks of the memory device 150 is equal to or greater than the threshold number of free blocks (nT), the memory system 110 may have to satisfy the sustained performance, that is, be in a sustained state. In order for the memory system 110 to satisfy the sustained performance, the memory system 110 may perform a garbage collection operation with a performance represented by the difference between the total performance Ptotal and the sustain performance. 'GCi' shown in the graph on the right side may represent this difference.

When the number of free blocks of the memory device 150 is less than the threshold number of free blocks (n<T), the memory system 110 may have to quickly generate free blocks since the memory device 150 is in a dirty state. In the dirty state, the memory system 110 may be able to actively secure free storage space by further increasing the garbage collection operation performance as the number of free blocks decreases.

The GC performance ratio may be determined based on the number of free blocks so that the memory system 110 sustains the foreground operation performance at the sustained performance level in the sustained state and actively secures in the dirty state free storage space as the number of free blocks decreases. For example, the performance ratio may be calculated as shown in Equation 1.

$$Rgc(n) = \begin{cases} G(n)(T-n) + Rgci & (n < T) \\ Rgci & (n \geq T) \end{cases} \quad \text{[Equation 1]}$$

In Equation 1, n may represent the number of free blocks of the memory device 150; Rgc(n) may represent the ratio of the garbage collection operation performance to the total performance of the memory system 110, which is a function of the number of free blocks; T may represent the threshold number of free blocks, which may be predetermined; Rgci may represent a constant that is set based on the desired or required sustained performance; and G(n) may be a function of the number of free blocks to determine the performance ratio in the dirty state.

When the number of free blocks of the memory device 150 is equal to or greater than the threshold number of free blocks (n≥T), the memory system 110 may have to sustain the foreground operation performance to the sustained performance. When the number of free blocks is equal to or greater than the threshold number of free blocks (nT), the garbage collection scheduler 204 may determine the garbage collection operation performance as the constant Rgci. For example, Rgci may be determined as the ratio of the remaining performance 'GCi' to the total performance Ptotal $$\left(\frac{Gci}{Ptotal}\right).$$

Referring to the graphs on the right sides of FIGS. 6A and 6B, the garbage collection operation performance (i.e., the remaining performance 'GCi') in the n≥T time period may have a constant value.

When the number of free blocks of the memory device 150 is less than the threshold number of free blocks (n<T), the memory system 110 may increase the performance ratio of the garbage collection operation in order to secure free blocks through the more frequent garbage collection operation. As the number of free blocks becomes smaller and smaller, the need for securing free storage space increases. Therefore, it is preferred that the garbage collection executor 206 frequently generates free blocks by increasing the garbage collection operation performance as the number of free blocks decreases in the n<T time period. Therefore, in the n<T section, as the n value becomes smaller, the function G(n) may be selected to increase the value of Rgc(n).

In the example of FIG. 6A, the function G(n) may be a positive linear function of n. Referring to the graph on the right side of FIG. 6A, as the n value decreases in the n<T time period, the garbage collection operation performance may increase in the form of a linear function.

In the example of FIG. 6B, the function G(n) may be a non-linear function of n. Referring to the graph on the right side of FIG. 6B, as the n value decreases in the n<T time period, the garbage collection operation performance may increase in the form of a quadratic function.

The function G(n) shown in FIGS. 6A and 6B are not more than mere examples, and the function G(n) may be variously selected such that the value of Rgc(n) increases as the n value decreases in the n<T time period.

The garbage collection scheduler 204 may determine the performance ratio of the garbage collection operation as the function Rgc(n) based on the number of free blocks.

Referring back to FIG. 5, in step S504, the garbage collection scheduler 204 may schedule a garbage collection operation based on the performance ratio of the garbage collection operation. For example, the garbage collection scheduler 204 may schedule the garbage collection operation by determining the operation interval between the garbage collection operations based on the operation time duration of a garbage collection operation.

The garbage collection scheduler 204 may determine the garbage collection operation interval as a function of the performance ratio of the garbage collection operation. According to an embodiment of the present invention, the operation interval of the garbage collection operation may be determined based on the following Equation 2.

$$(\text{User write}) = \begin{cases} \{(A-1) - A \times Rgc(n)\} \times (GC \text{ write}) & (n < T) \\ \dfrac{1 - Rgc(n)}{Rgc(n)} \times (GC \text{ write}) & (n \geq T) \end{cases} \quad [\text{Equation 2}]$$

In Equation 2, (User write) may represent the operation interval between garbage collection operations that are represented by a user data write amount; Rgc(n) may represent the performance ratio of the garbage collection operation, which is described with reference to Equation 1; (GC write) may represent the amount of garbage collection data that are written in a single garbage collection operation; and A may represent a constant. According to an embodiment of the present invention, (GC write) may be determined based on the operation time duration of the garbage collection operation and the total performance of the memory system 110.

The derivation process of Equation 2 may be described in detail with reference to Equations 3 to 7 below.

According to an embodiment of the present invention, the operation interval between garbage collection operations may be determined differently in the case of the sustained state and the dirty state. For example, Equation 2 may be determined based on the following Equations 3 and 4.

Equation 3 may be an operation ratio of the garbage collection operation in the sustained state. In the sustained state, the performance of the memory system 110 may be mainly taken into the consideration. Therefore, the operation ratio of the garbage collection operation may be determined in proportion to the garbage collection operation performance to the foreground operation performance.

$$\frac{(GC \text{ write})}{(\text{User write})} = \frac{Pgc(n)}{Ptotal - Pgc(n)} = \frac{Rgc(n)}{1 - Rgc(n)} \quad (n \geq T) \quad [\text{Equation 3}]$$

In Equation 3, $$\frac{(GC \text{ write})}{(\text{User write})}$$

may represent the ratio of the amount of garbage collection data to the amount of user data written into the memory device 150; Ptotal may represent the total performance of the memory system 110; Pgc(n) may represent the garbage collection operation performance that is represented by a function of the number of free blocks; {Ptotal−Pgc(n)} may represent the difference between the total performance and the garbage collection operation performance, that is, the foreground operation performance; and $$\frac{Pgc(n)}{Ptotal - Pgc(n)}$$

may represent the garbage collection operation performance based on the foreground operation performance and may be represented by $$\frac{Rgc(n)}{1 - Rgc(n)}.$$

Pgc(n) may be represented by gc(n)×Ptotal. Based on Equation 3, an equation $$(\text{User write}) = \frac{1 - Rgc(n)}{Rgc(n)} \times (GC \text{ write})$$

in the n≥T time period of Equation 2 may be derived.

Equation 4 is used to determine the operation ratio of the garbage collection operation in the dirty state. It is important for the memory system 110 to secure a free storage space in the dirty state. Therefore, in order to determine the operation ratio of the garbage collection operation in the dirty state, not only the performance of the memory system 110 but also the amount of free storage space may have to be considered. The operation ratio of the garbage collection operation may be represented by Equation 4. The performance ratio function derived based on Equation 4 is described below with reference to Equations 5 to 8.

$$\frac{(\text{Page generation})}{(NAND \text{ write})} = \frac{Pgc(n)}{Ptotal - Pgc(n)} = \frac{Rgc(n)}{1 - Rgc(n)} \quad (n < T) \quad [\text{Equation 4}]$$

In Equation 4, (Page generation) may represent the amount of free storage space secured by a garbage collection operation; (NAND write) may represent the amount of data that are written into the memory device 150, which may be represented by (GC write)+(User write); and $$\frac{Pgc(n)}{Ptotal - Pgc(n)}$$

may represent the garbage collection operation performance based on the foreground operation performance, which may be represented by $$\frac{Rgc(n)}{1 - Rgc(n)}.$$

The amount of free storage space secured by a garbage collection operation will be described in detail with reference to FIG. 7.

Figure 7:
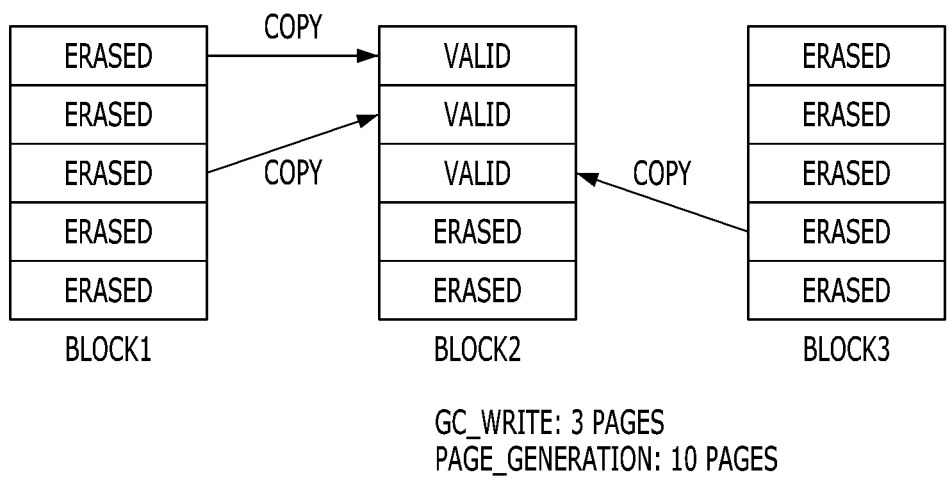
FIG. 7 illustrates an amount of free storage space secured by a garbage collection operation.

FIG. 7 illustrates an amount of free storage space secured by a garbage collection operation. FIG. 7 illustrates first to third memory blocks BLOCK1 to BLOCK3 each including five pages. FIG. 7 illustrates a state in which a garbage collection operation of the memory blocks shown in FIG. 3 is completed.

Referring to FIG. 7, the first block BLOCK1 and the third block BLOCK3 which are dirty blocks may be changed into free blocks by a garbage collection operation, and a second block BLOCK2 which is a free block may be changed into a dirty block. In the example of FIG. 7, 10 free pages may be generated (PAGE_GENEARATION: 10 PAGES) by writing three pages (GC_WRITE: 3PAGES) and performing an erase operation. A free page may refer to a page in an erase state which is available for data to be newly programmed. The number of free pages generated by the garbage collection operation may not be the same as the number of pages that are written in the garbage collection operation. As the number of valid pages of victim blocks increases, the garbage collection executor 206 may have to write more pages in order to generate as many free pages as are written in the garbage collection operation. The number of free pages generated through a garbage collection operation may be represented by Equation 5 below.

$$\text{(Page generation)} = \frac{\text{(Page of victim blocks)}}{\text{(Valid page of victim blocks)}} \times (GC\ \text{write}) \quad \text{[Equation 5]}$$

In Equation 4, (Page generation) may represent the amount of free pages generated by a garbage collection operation; (Page of victim blocks) may represent a total number of pages of victim blocks of the garbage collection operation; (Valid page of victim blocks) may represent a total number of valid pages of the victim blocks; and (GC write) may represent the amount of garbage collection data that are written in a single garbage collection operation. According to an embodiment of the present invention, (GC write) may be determined based on the operation time duration of the garbage collection operation and the total performance of the memory system 110. The number of free pages generated through the garbage collection operation is estimated based on the ratio of the number of valid pages of the victim blocks to the total number of pages of the victim blocks.

Referring back to Equation 4, $$\frac{\text{(Page generation)}}{(NAND\ \text{write})}$$

may represent the ratio of the amount of pages generated by a garbage collection operation to the amount of data written into the memory device 150. The data written into the memory device 150 may include user data and garbage collection data.

The ratio of the amount, e.g., number, of generated pages to the amount of data written into the memory device 150 may vary greatly depending on the number of valid pages of the victim blocks. According to an embodiment of the present invention, in order to reduce the computational load of the garbage collection scheduler 204 and the variation of the garbage collection operation performance, the amount or number of pages generated may be approximated by Equation 6 shown below.

$$\text{(Page generation)} = \text{(GC amplification factor)} \times \text{(GC write)} \quad \text{[Equation 6]}$$

Equation 6 shows that the approximate amount of free pages generated by a garbage collection operation is determined by the product of the garbage collection write amount and a garbage collection amplification factor. The garbage collection amplification factor may represent the relationship between the amount of free pages generated by a garbage collection operation and the amount of data written into the memory device 150. An example of the garbage collection amplification factor is described below.

When the free storage space of the memory device 150 is small, there may be a large amount of invalid data stored in memory blocks. When the garbage collection executor 206 performs a garbage collection operation by selecting memory blocks having a large amount of invalid data as victim blocks, the number of valid pages of the selected victim blocks may be smaller as the size of the free storage space becomes smaller. This is because when the free storage space of the memory device 150 is small, there may be many memory blocks, each having a large amount of invalid data stored therein. Therefore, when the number of free blocks is small, the garbage collection executor 206 may be able to generate the same amount of free pages by writing a small amount of valid data. In other words, when there are a small number of free blocks, the garbage collection executor 206 may be able to generate more memory blocks even though the same amount of valid data are written. Therefore, it is preferable to use the garbage collection amplification factor, which has a larger value as the number of free blocks becomes smaller. For example, as shown in Equation 7 below, the garbage collection amplification factor may be proportional to $Rgc(n)$, i.e., the performance ratio of the garbage collection operation to the total performance of the memory system 110, having a larger value as the number of free blocks becomes smaller.

$$\text{(GC amplification factor)} = A \times Rgc(n) \quad \text{[Equation 7]}$$

In Equation 7, A may represent a constant. $Rgc(n)$ is the performance ratio of the garbage collection operation to the total performance of the memory system 110 as described above with reference to Equation 1. Equation 7 indicates that when the memory device 150 has a small number of free blocks, the amount of free pages generated by a garbage collection operation may be small even though the same amount of garbage collection write is performed.

Based on Equations 4 to 7, (User write)=$\{(A-1)-A \times Rgc(n)\} \times (GC\ \text{write})$, which is an equation in the n<T time period of Equation 2, may be derived.

Referring back to FIG. 5, in step S506, the garbage collection executor 206 may perform a garbage collection operation based on the garbage collection operation interval, which is determined by the garbage collection scheduler 204. The garbage collection scheduler 204 may determine the operation interval that is represented as Equation 2. When the garbage collection scheduler 204 is completed, the garbage collection scheduler 204 may write the user data corresponding to the operation interval into the memory device 150, and then provide the garbage collection operation instruction signal to the garbage collection executor 206.

According to an embodiment of the present invention, the memory system 110 may determine the garbage collection performance ratio based on the number of free blocks and schedule a garbage collection operation based on the determined performance ratio. According to an embodiment of the present invention, the performance ratio may be determined based on Equation 1, and the garbage collection operation interval may be determined based on Equation 2. The garbage collection scheduler 204 may be variously designed to be applied to various memory systems 110 by determining only $G(n)$, $Rgci$, A, and T of Equations 1 and 2. $Rgci$ may be determined according to the performance requirement, and the garbage collection scheduler 204 may be designed to satisfy the performance requirement without the great number of the tests on the memory system 110.

Figure 8A:
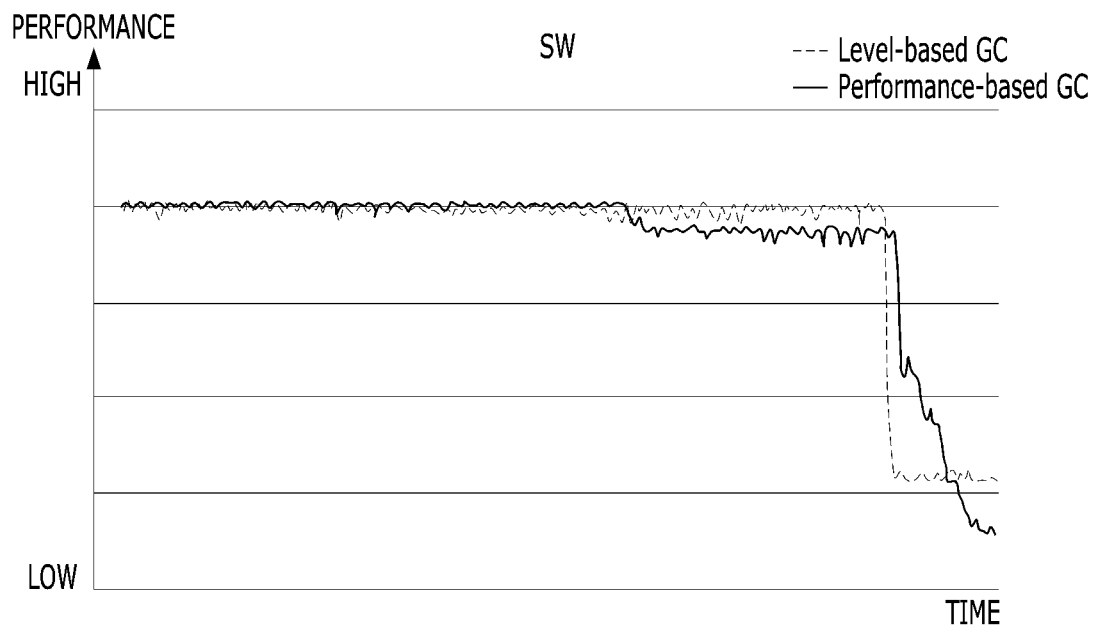
FIGS. 8A and 8B illustrate the performance of the memory system in accordance with an embodiment of the present invention.
Figure 8B:
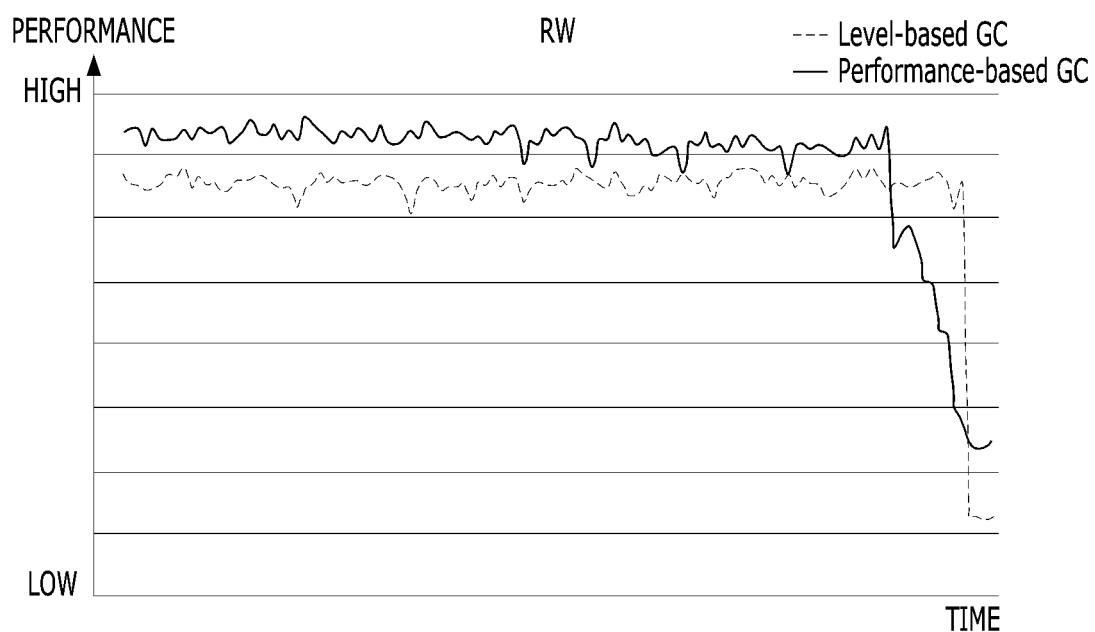

FIGS. 8A and 8B illustrate the performance of the memory system 110 in accordance with an embodiment of the present invention.

FIGS. 8A and 8B are graphs of performance test results while continuously performing a write operation on the memory system 110. The graphs of FIGS. 8A and 8B show the performance of a foreground operation based on the time of using the memory system 110. Since data are continuously written during the performance tests, the time of using the memory system 110 may be in proportion to the amount of valid data stored in the memory device 150. The dotted line shown in each graph may represent the performance of the foreground operation when a level-based garbage collection operation is performed according to a prior art, and the solid line may represent the performance of the foreground operation when the performance-based garbage collection operation is performed in accordance with an embodiment of the present invention.

FIG. 8A is a graph illustrating a result of performing a performance test while performing sequential write operations on the memory system 110. FIG. 8B is a graph illustrating a result of performing a performance test while performing a random write operation on the memory system 110.

Comparing the performances of the level-based garbage collection operations of FIGS. 8A and 8B may reveal the following facts. The memory system 110 may change to a dirty state later when a random write test is performed as compared to when the sequential write test is performed. In other words, the performance of the garbage collection operation may be different depending on the operation environment of the memory system 110. Therefore, even though the memory system 110 is configured according to a plurality of parameters, it is difficult to figure out whether the memory system 110 satisfies the performance requirement or not. Referring to FIG. 8B, it may be seen that when the random data are written, the garbage collection operation may not be sufficiently performed until the free storage space of the memory device 150 becomes significantly insufficient.

Comparing the performances of the performance-based garbage collection operations of FIGS. 8A and 8B may reveal the following facts. Regardless of the attributes of the write data, when the size of the free storage space decreases to a set level or less, the memory system 110 may change to the dirty state. In other words, according to an embodiment of the present invention, the garbage collection scheduler 204 may be designed to satisfy performance requirement(s) regardless of the operation environment of the memory system 110.

Also, the garbage collection scheduler 204 may schedule garbage collection operations by using the garbage collection performance ratio which is set such that the memory system satisfies the performance requirement(s) as shown in the graph on the right side of FIG. 6A. Therefore, the performance graphs of the performance-based garbage collection operations of FIGS. 8A and 8B may have a form similar to the left graph of FIG. 6A. Thus, the performance of the memory system 110 may be estimated without performing a large number of the tests on the memory system 110.

According to embodiments of the present invention, a controller may improve the performance of a memory system by dynamically adjusting the frequency at which a garbage collection operation is performed.

While the present invention has been illustrated and described with respect to specific embodiments, it will be apparent to those skilled in the art that various changes and modifications may be made without departing from the spirit and scope of the invention as defined in the following claims. The present invention encompasses all such changes and modifications that fall within the scope of the claims.

What is claimed is:

1. A memory system, comprising:
a memory device including a plurality of storage spaces; and
a controller suitable for controlling the memory device,
wherein the controller determines a performance ratio, which is ratio of performance of a garbage collection operation to a total performance of the memory system, for securing free storage space in the memory device based on a performance requirement of the memory system and the free storage space, schedules the garbage collection operation based on the performance ratio, and performs the garbage collection operation according to the schedule,
wherein the total performance indicates a sum of a performance of all operations performed in the memory system, and
wherein the performance ratio is determined according to Equation 1:

$$Rgc(n) = \begin{cases} G(n)(T-n) + Rgci & (n < T) \\ Rgci & (n \geq T) \end{cases} \quad \text{[Equation 1]}$$

where n represents the number of free storage spaces;
Rgc(n) represents the performance ratio as a function of the number of free storage spaces;
T represents a threshold number of free storage spaces;
Rgci represents a constant that is set based on the desired sustained performance when $n \geq T$; and
G(n) is a function of the number of free storage spaces that increases the performance ratio when $n < T$.

2. The memory system of claim 1, wherein the controller determines the performance ratio to satisfy sustained performance in a sustained state when the free storage space is equal to or greater than a threshold free storage space and to increase the free storage space in a dirty state when the free storage space is less than the threshold free storage space.

3. The memory system of claim 2,
wherein, in the sustained state, the controller determines an operation interval of the garbage collection operation to be in proportion to a set operation time duration of a garbage collection operation and the performance ratio, and
wherein, in the dirty state, the controller determines the operation interval based on the operation time duration, a free storage space generation amount, and the performance ratio, and
wherein the controller schedules the garbage collection operation such that the garbage collection operation is performed for the operation time duration and stops at the end of the operation time duration.

4. A controller for controlling a memory device including a plurality of storage spaces, comprising:
a garbage collection scheduler suitable for determining a performance ratio, which is a ratio of performance of a garbage collection operation to a total performance of a memory system, for securing free storage space in the memory device based on performance requirement of the memory system and the free storage space, and scheduling the garbage collection operation based on the performance ratio of the garbage collection operation;
a storage space monitor suitable for determining the free storage space in the memory device; and
a garbage collection executor suitable for performing the garbage collection operation according to the schedule,
wherein the total performance indicates a sum of a performance of all operations performed in the memory system, and wherein the performance ratio is determined based on Equation 1:

$$Rgc(n) = \begin{cases} G(n)(T-n) + Rgci & (n < T) \\ Rgci & (n \geq T) \end{cases} \quad \text{[Equation 1]}$$

where n represents the number of free storage spaces among the storage spaces;
Rgc(n) represents the performance ratio as a function of the number of the free storage spaces;
T represents a threshold number of free storage spaces;
Rgci represents a constant that is set to satisfy sustained performance when n≥T; and
G(n) is a function to increase the performance ratio when n<T.

5. The controller of claim 4, wherein the garbage collection scheduler determines the performance ratio to satisfy sustained performance when the free storage space is equal to or greater than a threshold free storage space, and
determines the performance ratio to increase the free storage space when the free storage space is less than the threshold free storage space.

6. The controller of claim 5,
wherein, when the number of the free storage spaces is equal to or greater than the threshold number of free storage spaces, the garbage collection scheduler determines an operation interval of the garbage collection operation to be in proportion to a set operation time duration of a garbage collection operation and the performance ratio,
wherein the garbage collection scheduler determines, when the number of the free storage spaces is less than the threshold number of the free storage spaces, the operation interval based on the operation time duration, a free storage space generation amount, and the performance ratio, and
wherein the garbage collection scheduler schedules the garbage collection operation such that the garbage collection operation is performed for the operation time duration and stops at the end of the operation time duration.

7. The memory system of claim 6, wherein Rgci is determined based on the total performance of the memory system and the sustained performance.

8. The memory system of claim 6, wherein G(n) is a positive linear function.

9. The memory system of claim 6,
wherein the controller determines the operation interval based on Equation 2, and
wherein the controller schedules the garbage collection operation such that the garbage collection operation is performed for the operation time duration and stops at the end of the operation time duration, $$(\text{User write}) = \begin{cases} \{(A-1) - A \times Rgc(n)\} \times (GC\ \text{write}) & (n < T) \\ \dfrac{1 - Rgc(n)}{Rgc(n)} \times (GC\ \text{write}) & (n \geq T) \end{cases}, \quad \text{[Equation 2]}$$

where (User write) represents the operation interval represented by a user data amount;
A represents a constant; and
(GC write) represents the amount of garbage collection data written by the garbage collection operation for the operation time duration.

10. The controller of claim 4, wherein G (n) is a positive linear function.

11. The controller of claim 4,
wherein the operation interval is represented by Equation 2, and
wherein the garbage collection scheduler schedules the garbage collection operation such that the garbage collection operation is performed for the operation time duration and stops at the end of the operation time duration, $$(\text{User write}) = \begin{cases} \{(A-1) - A \times Rgc(n)\} \times (GC\ \text{write}) & (n < T) \\ \dfrac{1 - Rgc(n)}{Rgc(n)} \times (GC\ \text{write}) & (n \geq T) \end{cases} \quad \text{[Equation 2]}$$

where (User write) represents the operation interval represented by a user data amount;
A represents a constant; and
(GC write) represents the amount of garbage collection data that are written by the garbage collection operation for the set operation time duration.

12. An operating method of a controller, the operating method comprising controlling a nonvolatile memory device to perform a garbage collection operation according to an operation interval determined by Equation 2:

$$(\text{User write}) = \begin{cases} \{(A-1) - A \times Rgc(n)\} \times (GC\ \text{write}) & (n < T) \\ \dfrac{1 - Rgc(n)}{Rgc(n)} \times (GC\ \text{write}) & (n \geq T) \end{cases}, \quad \text{[Equation 2]}$$

(User write) represents the operation interval represented by a user data amount;
n represents a number of free storage spaces within the nonvolatile memory device;
T represents a threshold number of free storage spaces;
A represents a constant;
Rgc(n) represents a performance ratio of the garbage collection operation determined by Equation 1; and
(GC write) represents an amount of garbage collection data written by the garbage collection operation for a set operation time duration, $$Rgc(n) = \begin{cases} G(n)(T-n) + Rgci & (n < T) \\ Rgci & (n \geq T) \end{cases}, \quad \text{[Equation 1]}$$

wherein
Rgc(n) represents the performance ratio of the garbage collection operation;
Rgci represents a constant that is set to satisfy a desired sustained performance when n≥T; and
G (n) is a function that increases the performance ratio of the garbage collection operation when n<T.

13. A memory system, comprising:
a memory device including a plurality of storage spaces; and a controller suitable for controlling the memory device,
wherein the controller determines a performance ratio, which is ratio of performance of a garbage collection operation to a total performance of the memory system, for securing free storage space in the memory device based on a performance requirement of the memory system and the free storage space, schedules the garbage collection operation based on the performance ratio, and performs the garbage collection operation according to the schedule,
wherein the total performance of the memory system indicates a sum of a garbage collection operation performance and a foreground operation performance in the memory system,
wherein the garbage collection operation performance is based on at least one of copying valid pages of victim blocks into a target block and erasing the data of the victim blocks,
wherein the foreground operation performance is based on at least one of performing a read operation and performing a write operation, and
wherein the performance requirement includes a read throughput and a write throughput of the memory system in a sustain state having the free storage space to maintain the foreground operation performance at a desired level, and a dirty state in which the free storage space is insufficient to maintain the foreground operation performance at the desired level.

14. The memory system of claim 13, wherein the controller determines the performance ratio to satisfy sustained performance in the sustained state when the free storage space is equal to or greater than a threshold free storage space and to increase the free storage space in the dirty state when the free storage space is less than the threshold free storage space.

15. A controller for controlling a memory device including a plurality of storage spaces, comprising:
a garbage collection scheduler suitable for determining a performance ratio, which is a ratio of performance of a garbage collection operation to a total performance of a memory system, for securing free storage space in the memory device based on a performance requirement of the memory system and the free storage space, and scheduling the garbage collection operation based on the performance ratio of the garbage collection operation;
a storage space monitor suitable for determining the free storage space in the memory device; and
a garbage collection executor suitable for performing the garbage collection operation according to the schedule,
wherein the total performance of the memory system indicates a sum of a garbage collection operation performance and a foreground operation performance in the memory system,
wherein the garbage collection operation performance is based on at least one of copying valid pages of victim blocks into a target block and erasing the data of the victim blocks,
wherein the foreground operation performance is based on at least one of performing a read operation and performing a write operation, and
wherein the performance requirement includes a read throughput and a write throughput of the memory system in a sustain state having the free storage space to maintain the foreground operation performance at a desired level, and a dirty state in which the free storage space is insufficient to maintain the foreground operation performance at the desired level.

16. The controller of claim 15, wherein the garbage collection scheduler determines the performance ratio to satisfy performance in a sustained state when the free storage space is equal to or greater than a threshold free storage space, and
determines the performance ratio to increase the free storage space when the free storage space is less than the threshold free storage space.

17. The controller of claim 16, wherein when the number of the free storage spaces is equal to or greater than the threshold number of free storage spaces, the garbage collection scheduler determines an operation interval of the garbage collection operation to be in proportion to a set operation time duration of a garbage collection operation and the performance ratio,
wherein the garbage collection scheduler determines, when the number of the free storage spaces is less than the threshold number of the free storage spaces, the operation interval based on the operation time duration, a free storage space generation amount, and the performance ratio, and
wherein the garbage collection scheduler schedules the garbage collection operation such that the garbage collection operation is performed for the operation time duration and stops at the end of the operation time duration.

* * * * *